US010554852B2

(12) United States Patent
Kamens et al.

(10) Patent No.: US 10,554,852 B2
(45) Date of Patent: Feb. 4, 2020

(54) SYSTEMS, METHODS AND COMPUTER PROGRAM PRODUCTS FOR FAX DELIVERY AND MAINTENANCE

(71) Applicant: OPEN TEXT SA ULC, Halifax (CA)

(72) Inventors: Samuel N. Kamens, West Orange, NJ (US); Hugh Beverly Appling, Vienna, VA (US); Charles J. Badaracco, Lincroft, NJ (US); Edward Theodore Pieluc, Jr., Howell, NJ (US); Jeffrey Alan Diehl, Fairfax, VA (US)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 16/397,489

(22) Filed: Apr. 29, 2019

(65) Prior Publication Data

US 2019/0253579 A1  Aug. 15, 2019

Related U.S. Application Data

(63) Continuation of application No. 16/154,988, filed on Oct. 9, 2018, now Pat. No. 10,306,097, which is a continuation of application No. 15/681,677, filed on Aug. 21, 2017, now Pat. No. 10,136,023, which is a continuation of application No. 15/016,591, filed on Feb. 5, 2016, now Pat. No. 9,762,769, which is a continuation of application No. 14/295,910, filed on Jun. 4, 2014, now Pat. No. 9,288,361.

(Continued)

(51) Int. Cl.
*H04N 1/32* (2006.01)
*H04N 1/21* (2006.01)

(52) U.S. Cl.
CPC ....... *H04N 1/32432* (2013.01); *H04N 1/2187* (2013.01); *H04N 2201/0093* (2013.01); *H04N 2201/3218* (2013.01); *H04N 2201/3295* (2013.01)

(58) Field of Classification Search
None
See application file for complete search history.

(56) References Cited

U.S. PATENT DOCUMENTS 5,390,910 A * 2/1995 Mandel .................. B65H 39/11
                                                      270/58.18
5,495,581 A    2/1996 Tsai
(Continued)

OTHER PUBLICATIONS

"Microsoft Fax Connector Configuration Guide for Windows Server 2008 R2," FaxBack VoIP Fax Solutions, Copyright by FaxBack, Inc. 2011, 11 pages.
(Continued)

*Primary Examiner* — Anh-Vinh T Nguyen
(74) *Attorney, Agent, or Firm* — Sprinkle IP Law Group

(57) ABSTRACT

This disclosure is directed to systems and methods for the delivery and maintenance of faxes where the faxes may remain at a faxing system for a minimal amount of time. The faxing system may send a queued fax to a connector responsive to a request from the connector to pull or retrieve a fax. The connector is configured to send a release notification to the faxing system after the fax is received. The faxing system is configured to delete the queued fax as soon as confirmation of the delivery of the fax can be determined or when an expiration time has elapsed.

20 Claims, 5 Drawing Sheets

Related U.S. Application Data

(60) Provisional application No. 61/831,803, filed on Jun. 6, 2013.

(56) References Cited

U.S. PATENT DOCUMENTS

| | | | |
|---|---|---|---|
| 5,517,556 A * | 5/1996 | Pounds | H04N 1/324 379/100.06 |
| 5,555,100 A | 9/1996 | Bloomfield et al. | |
| 5,627,658 A | 5/1997 | Connors et al. | |
| 5,758,081 A | 5/1998 | Aytac | |
| 5,838,458 A | 11/1998 | Tsai | |
| 6,067,082 A * | 5/2000 | Enmei | G06F 1/1626 178/18.01 |
| 6,292,267 B1 | 9/2001 | Mori et al. | |
| 6,301,611 B1 | 10/2001 | Matsumoto et al. | |
| 6,671,063 B1 | 12/2003 | Iida | |
| 6,674,541 B1 | 1/2004 | Kamiyama et al. | |
| 6,678,864 B1 | 1/2004 | Tsai | |
| 6,781,721 B2 | 8/2004 | Toyoda et al. | |
| 6,961,856 B1 | 11/2005 | Kouropoulus | |
| 7,057,752 B1 | 6/2006 | Klotz, Jr. | |
| 7,177,042 B2 | 2/2007 | Mimoto | |
| 7,206,085 B1 | 4/2007 | Eguchi | |
| 7,245,391 B2 | 7/2007 | Nishimura | |
| 7,268,906 B2 | 9/2007 | Ruhl et al. | |
| 7,965,423 B2 | 6/2011 | Glunz | |
| 8,549,540 B1 | 10/2013 | Dixon et al. | |
| 8,937,736 B2 | 1/2015 | Rebert et al. | |
| 8,995,025 B2 | 3/2015 | Rebert | |
| 9,288,361 B2 | 3/2016 | Kamens et al. | |
| 9,762,769 B2 | 9/2017 | Kamens et al. | |
| 10,136,023 B2 | 11/2018 | Kamens et al. | |
| 2001/0040692 A1 | 11/2001 | Matsueda et al. | |
| 2002/0036791 A1 | 3/2002 | Murphy | |
| 2002/0051146 A1 | 5/2002 | Tanimoto | |
| 2002/0054350 A1 | 5/2002 | Kakigi et al. | |
| 2002/0063882 A1 | 5/2002 | Sekiguchi | |
| 2002/0064272 A1 | 5/2002 | Naghi et al. | |
| 2002/0093531 A1 | 7/2002 | Barile | |
| 2002/0191212 A1 | 12/2002 | Simpson et al. | |
| 2003/0007171 A1 | 1/2003 | Simpson et al. | |
| 2003/0007178 A1 | 1/2003 | Jeyachandran et al. | |
| 2004/0145775 A1 | 7/2004 | Kubler et al. | |
| 2004/0162076 A1 | 8/2004 | Chowdry et al. | |
| 2005/0071495 A1 | 3/2005 | Kadota | |
| 2005/0117928 A1 | 6/2005 | Hino | |
| 2006/0001907 A1 | 1/2006 | Kumagai | |
| 2006/0028680 A1 | 2/2006 | Uchiyama et al. | |
| 2006/0064313 A1 * | 3/2006 | Steinbarth | G06Q 10/10 705/322 |
| 2007/0008696 A1 | 1/2007 | Masuda | |
| 2007/0121156 A1 | 5/2007 | Ando | |
| 2007/0147870 A1 | 6/2007 | Shindo et al. | |
| 2007/0182984 A1 | 8/2007 | Ragnet et al. | |
| 2008/0231895 A1 | 9/2008 | Yamazaki | |
| 2009/0189451 A1 | 7/2009 | Roepke | |
| 2009/0316182 A1 | 12/2009 | Lee | |
| 2010/0060922 A1 | 3/2010 | Teranoshita | |
| 2010/0208726 A1 | 8/2010 | Oliszewski et al. | |
| 2010/0231971 A1 | 9/2010 | Silverbrook et al. | |
| 2010/0250901 A1 | 9/2010 | Abernathy et al. | |
| 2010/0306321 A1 | 12/2010 | Noursalehi et al. | |
| 2011/0058211 A1 | 3/2011 | Noecker, Jr. et al. | |
| 2011/0110366 A1 | 5/2011 | Moore et al. | |
| 2012/0143658 A1 | 6/2012 | Toscano et al. | |
| 2012/0257249 A1 | 10/2012 | Natarajan | |
| 2012/0274988 A1 | 11/2012 | Bloomfield | |
| 2012/0293836 A1 | 11/2012 | Hiraike | |
| 2012/0297368 A1 | 11/2012 | Bingell et al. | |
| 2012/0297471 A1 | 11/2012 | Smithson | |
| 2013/0086582 A1 | 4/2013 | Cardona et al. | |
| 2013/0088741 A1 | 4/2013 | Murata et al. | |
| 2013/0097600 A1 | 4/2013 | Cardona et al. | |
| 2013/0163037 A1 | 6/2013 | Huster | |
| 2013/0179448 A1 | 7/2013 | Dixon et al. | |
| 2013/0179732 A1 | 7/2013 | Alanis et al. | |
| 2013/0252594 A1 | 9/2013 | Faillaci et al. | |
| 2013/0287189 A1 | 10/2013 | Cichielo et al. | |
| 2013/0293933 A1 | 11/2013 | Rebert et al. | |
| 2013/0308150 A1 | 11/2013 | Shinagawa | |
| 2013/0346522 A1 | 12/2013 | Lennstrom et al. | |
| 2014/0129607 A1 | 5/2014 | Nagumo | |
| 2014/0268219 A1 | 9/2014 | Ho et al. | |
| 2014/0307294 A1 | 10/2014 | Rebert | |
| 2014/0362419 A1 | 12/2014 | Kamens et al. | |
| 2015/0026294 A1 | 1/2015 | Hiller et al. | |
| 2015/0067686 A1 | 3/2015 | Davis | |
| 2015/0103379 A1 | 4/2015 | Basil | |
| 2015/0156132 A1 | 6/2015 | Emejulu et al. | |
| 2015/0169339 A1 | 6/2015 | Anderson et al. | |
| 2015/0172204 A1 | 6/2015 | Anderson et al. | |
| 2015/0244705 A1 | 8/2015 | Flamini et al. | |
| 2015/0339082 A1 | 11/2015 | Yeung | |
| 2015/0365560 A1 | 12/2015 | Naito | |
| 2016/0063379 A1 | 3/2016 | Adderly et al. | |
| 2016/0092792 A1 | 3/2016 | Chandrasekaran et al. | |
| 2016/0154892 A1 | 6/2016 | Carrier et al. | |
| 2016/0165069 A1 | 6/2016 | Inoue et al. | |
| 2016/0301766 A1 | 10/2016 | Ionescu et al. | |
| 2016/0328330 A1 | 11/2016 | Ayub et al. | |
| 2016/0335415 A1 | 11/2016 | Jones et al. | |
| 2017/0374231 A1 | 12/2017 | Kamens et al. | |
| 2018/0300496 A1 | 10/2018 | Shriver et al. | |
| 2019/0052770 A1 | 2/2019 | Kamens et al. | |

OTHER PUBLICATIONS

"AudioCodes Fax Connection Software," retrieved from <<http://www.faxata.com/faxconnector.html>>, Copyright by AudioCodes Limited 2003-2015, 1 page.

"RightFax Connector for Kyocera," Oct. 7, 2015, retrieved from <<http://www.atechnj.com/product/rightfax-connector-for-kyocera/>>, 4 pages.

Office Action issued for U.S. Appl. No. 14/295,910, dated Jul. 16, 2015, 10 pages.

Notice of Allowance issued for U.S. Appl. No. 16/154,988, dated Jan. 17, 2019, 16 pages.

\* cited by examiner

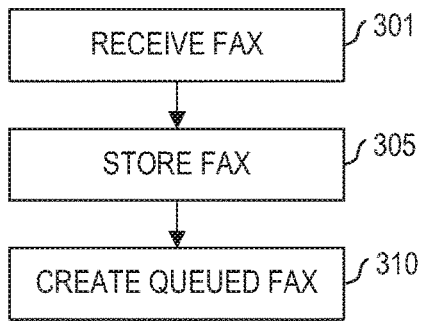
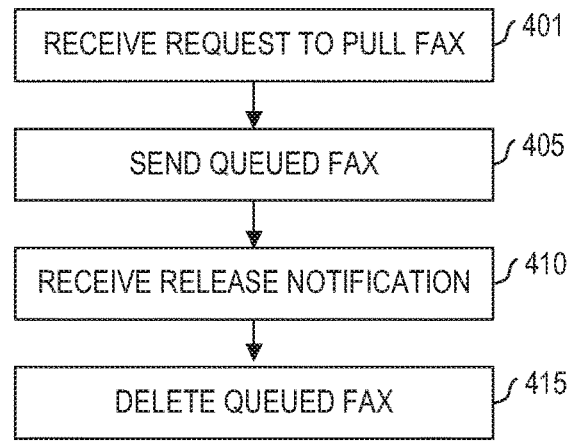
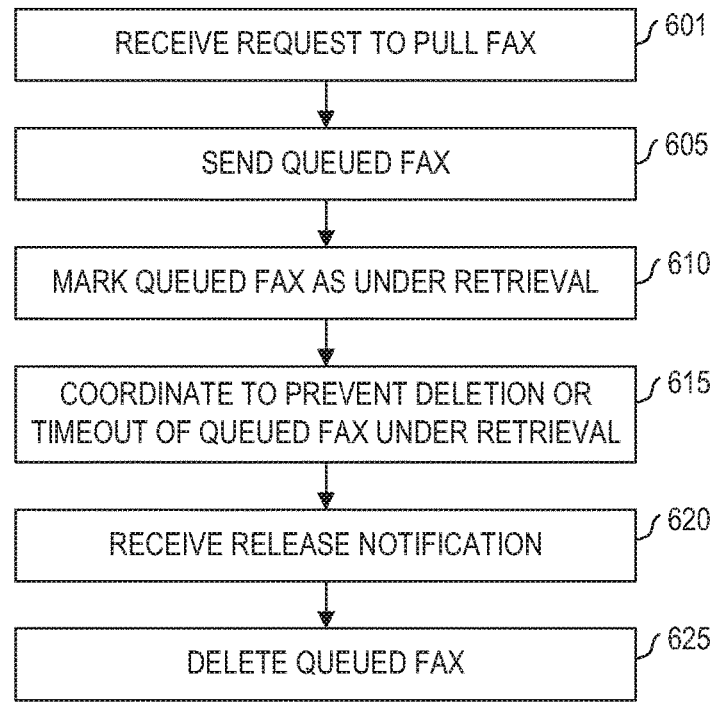

SYSTEMS, METHODS AND COMPUTER PROGRAM PRODUCTS FOR FAX DELIVERY AND MAINTENANCE

CROSS-REFERENCE TO RELATED APPLICATIONS

This application is a continuation of, and claims a benefit of priority under 35 U.S.C. § 120 from, U.S. patent application Ser. No. 16/154,988, filed Oct. 9, 2018, issued as U.S. Pat. No. 10,306,097, entitled "SYSTEMS, METHODS AND COMPUTER PROGRAM PRODUCTS FOR FAX DELIVERY AND MAINTENANCE," which is a continuation of, and claims a benefit of priority from, U.S. patent application Ser. No. 15/681,677, filed Aug. 21, 2017, issued as U.S. Pat. No. 10,136,023, entitled "SYSTEMS, METHODS AND COMPUTER PROGRAM PRODUCTS FOR FAX DELIVERY AND MAINTENANCE," which is a continuation of U.S. patent application Ser. No. 15/016,591, filed Feb. 5, 2016, issued as U.S. Pat. No. 9,762,769, entitled "SYSTEMS, METHODS AND COMPUTER PROGRAM PRODUCTS FOR FAX DELIVERY AND MAINTENANCE," which is a continuation of U.S. patent application Ser. No. 14/295,910, filed Jun. 4, 2014, issued as U.S. Pat. No. 9,288,361, entitled "SYSTEMS, METHODS AND COMPUTER PROGRAM PRODUCTS FOR FAX DELIVERY AND MAINTENANCE," which claims a benefit of priority from U.S. Provisional Application No. 61/831,803, filed Jun. 6, 2013, entitled "SYSTEM AND METHOD FOR FAX DELIVERY AND MAINTENANCE," all of which are fully incorporated by reference herein, including the appendices.

TECHNICAL FIELD

This disclosure relates generally to digital content delivery in a network environment. More particularly, this disclosure relates the delivery and maintenance of faxes. Even more specifically, this disclosure relates to the delivery and maintenance of faxes using a distributed system.

BACKGROUND

Facsimile refers to a telecommunications technology used to transfer copies of documents over a telephone network such as the publicly switched telephone network (PSTN) to a telephone number connected to a fax machine. Typically, an original document is scanned and the content of the document is converted into a bitmap image for the transmission. The fax machine at the receiving end of the transmission reconverts the bitmap image and prints a paper copy of the original document. Faxing provides a secure, traceable and non-repudiable mechanism for content delivery and can be particularly useful in business environments.

Faxing, however, has limitations. For example, conventional fax machines can only transmit black and white files with limited resolution in a specific format such as the Tagged Image File Format (TIFF). Further, the transmission speed can be very slow compared to today's Internet based standards. Not surprisingly, the faxing technology in recent years has faced increasing competition from Internet Protocol (IP) networks such as the Internet, local area networks (LANs), wide area networks (WANs), intranets, extranets, etc. These IP networks based alternatives may be referred to as Internet faxing. With Internet faxing, fax servers may be utilized instead of or in addition to standalone fax machines. A fax server generally refers to a server computer having the necessary fax software and hardware to receive and send faxes over IP and/or PSTN networks.

Using fax servers may reduce the cost of transmission since there is no telephone connection charge when sending a fax over the Internet. However, conventional faxing systems using fax servers do not confirm delivery of faxes. Furthermore, no mechanism currently exists to reduce the time a fax stays in a fax server, after the fax is sent from a sender and before the fax is received by a receiver.

SUMMARY OF THE DISCLOSURE

An object of the invention relates to tracking when a fax is received by a receiver. Another object of the invention relates to removing a fax from a fax server as soon as the fax is received by a receiver to thereby reduce the time the fax stays in the fax server.

As described below, these and other objects of the invention can be realized in embodiments of a new faxing solution. For example, in some embodiments, a faxing system running on one or more server machines may maintain a queue for processing faxes. When a fax comes in, for instance, from a sender system, the faxing system may create a queued fax with a job identifier. The faxing system may store the document(s) associated with the fax in a data store and place a job item with the job identifier in the queue. An example of a queued fax, therefore, may include a document in a data store and a job item in a queue. In some embodiments, in addition to a job identifier, a job item may include a customer identifier and a document identifier. Depending upon implementation, in some embodiments, a faxing system may create for each incoming fax a pull item and a hold item, in addition to a job item.

In some embodiments, the faxing system may receive a request from a connector in a receiver system, for instance, to pull or retrieve a fax. In response, the faxing system may send the requested fax to the connector. In some embodiments, after the requested fax is sent to the requesting connector, the corresponding queued fax may be marked as under retrieval. In some embodiments, the faxing system may operate to prevent the queued fax from being deleted until after a release notification is received from the requesting connector. According to embodiments, a connector is configured to send a release notification to a faxing system after a requested fax is received. Responsive to receiving such a release notification from the connector, the queued fax is deleted or otherwise removed from the faxing system.

One embodiment of a faxing system may include a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein.

Numerous other embodiments are also possible.

Embodiments disclosed herein can provide many advantages. For example, once a faxing system has confirmation that a document has been retrieved, the faxing system can proceed with any necessary or desired post-delivery processing associated with the document without delay. Examples of post-delivery processing may include, but are not limited to, deletion, report generation, archiving, etc.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 3 depicts a flow chart illustrating one embodiment of a method performed by a faxing system for receipt and maintenance faxes.

FIG. 4 depicts a flow chart illustrating one embodiment of a method performed by a faxing system for delivery and maintenance of faxes.

FIG. 6 depicts a flow chart illustrating one embodiment of a method performed by a faxing system for delivery and maintenance of faxes.

DETAILED DESCRIPTION

Figure 1:
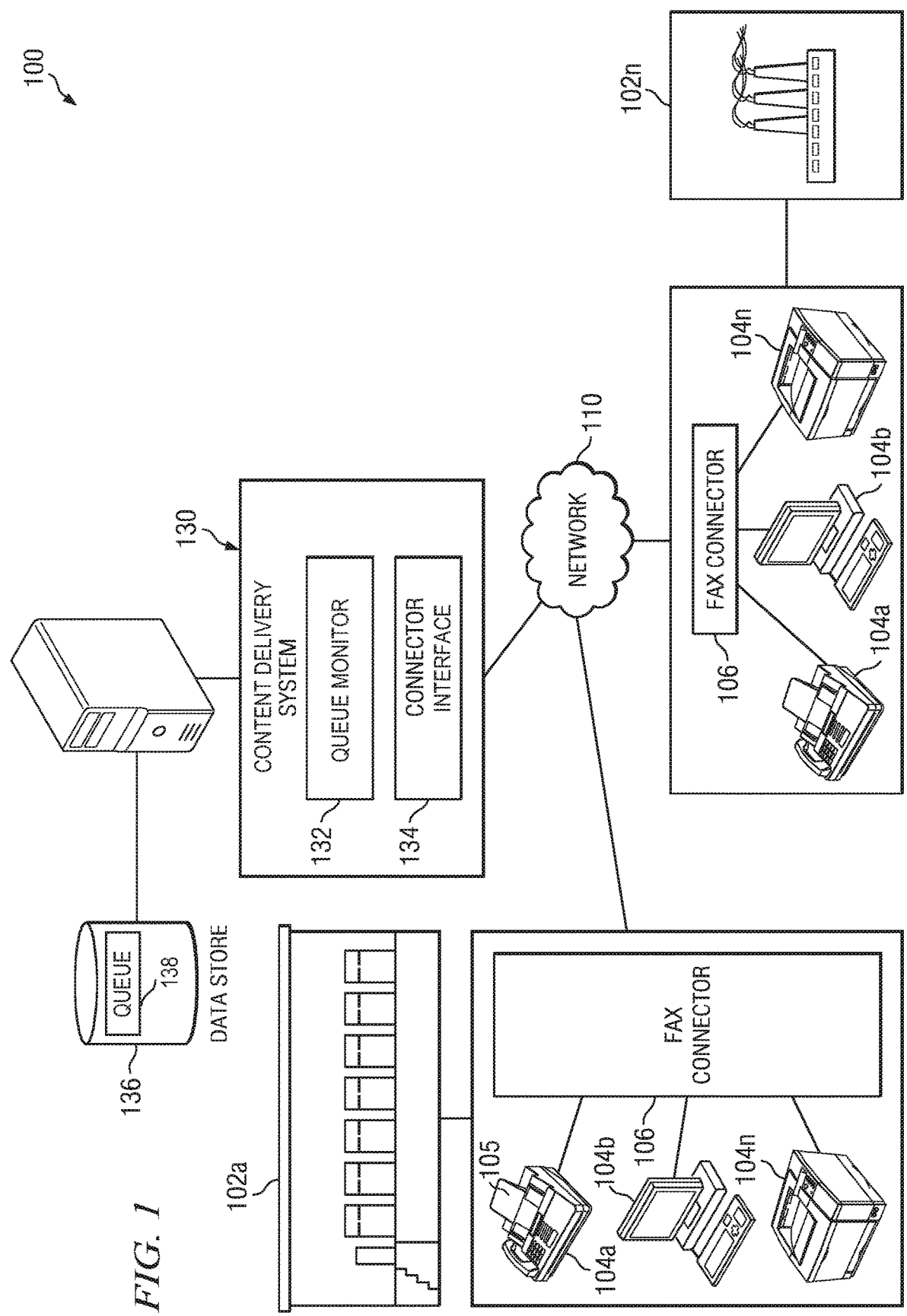
FIG. 1 depicts a diagrammatic representation of one embodiment of an example of network architecture for a faxing system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing specific embodiments, a brief overview of the context of the disclosure may be helpful. In many cases, a distributed architecture may be used to implement fax services over a computer-based network such as an Internet Protocol (IP or other protocol) based network. In most cases, fax users perform faxing utilizing fax servers, fax appliances, fax software, etc. connected to a computer-based network such as the Internet via fax connectors. A fax connector can function as a communication link between a fax server and other servers such as an email exchange server at a user's site. Thus, in some embodiments, a fax connector may be deployed at a user's site, and a faxing system may be deployed remotely from the user's site. The fax connector can be accessed at the user's site over a computer-based network in order to perform functions associated with faxing, including sending, receiving and obtaining status on faxes. The fax connector deployed at the user's site communicates with the remotely deployed faxing system to send, receive, obtain status on, or perform other functions associated with, faxing. The remotely deployed faxing system may use any appropriate network (such as publicly switched telephone network (PSTN, or IP network)) for the actual transmission or receipt of faxes. In this way, faxing can be accomplished using embodiments of such systems and methods substantially without deviation from a user's previous faxing methodologies or workflows. This allows a user to use their familiar fax environment without the restrictions of using a browser and without the need to maintain local telephony hardware, licenses, or telephone lines.

In certain cases, however, the architecture utilized to implement, or used in conjunction with, Internet-based faxing may present certain issues. For example, because of security concerns or the like, the remotely deployed faxing system may not push delivery of faxes to their destinations. Rather, in order to receive a fax from the remotely deployed faxing system, a fax connector may perform a "pull" of faxes intended for it. Specifically, the fax connector at the user's site may query the remotely deployed faxing system as to whether there are any faxes for that connector and, if any faxes are available for that connector, the remotely deployed faxing system provides the fax to the fax connector at the user's site. Thus, faxes are delivered by the remotely deployed faxing system to the fax connector (and thus to the user at the site associated with the fax connector) in response to a query received from the fax connector.

The above described architecture may lead to issues with the maintenance of the faxes at the remotely deployed faxing system. For example, a remotely deployed faxing system may have no method to confirm whether a fax has been received by a fax connector requesting the fax as there may be little way to confirm a successful delivery. Additionally, in some cases, a remotely deployed faxing system may have no method to determine whether a fax has ever even been requested by a fax connector. Conventionally, a remotely deployed faxing system may retain the fax for a few days even after it had been pulled. That is, a remotely deployed faxing system normally may not take any action to remove a fax from its system based on the fact that the fax has been retrieved. The inability for the remotely deployed faxing system to track and process the fax in a timely manner may cause the fax to remain in a state of limbo indefinitely at the remotely deployed faxing system.

There could be various reasons such as compliance issues for not wanting to delete a fax from a fax server right away after its retrieval. For example, a company that deals with protected health information must ensure that all the required physical, network, and process security measures are in compliance with the Health Insurance Portability and Accountability Act (HIPAA). As another example, a merchant accepting credit cards is required to be in compliance with Payment Card Industry (PCI) Security Council standards. Thus, a fax server for such a company and/or merchant may be required to store their faxes for a certain period of time to be PCI and/or HIPAA compliant.

However, for a variety of reasons pertaining to rules, regulations, laws, security concerns, etc. applicable to the transmission of data, it may be highly undesirable for faxes to remain at a remotely deployed faxing system. These concerns may be exacerbated by the fact that, in many cases, a remotely deployed faxing system may be provided by an entity other than either the entity that sent the fax and/or the entity for which the fax is intended. Part and parcel with this then, a remotely deployed faxing system may be in a different geographic location or subject to a different set of rules, regulation or laws than the sending or receiving entities. Accordingly, it is desirable to have faxes remain at a remotely deployed faxing system for as little time as possible and deleted as soon as confirmation of the delivery of the fax can be determined.

To that end, attention is now directed to the systems and method for delivery and maintenance of faxes disclosed herein. Specifically, embodiments disclosed herein may be implemented at a remotely deployed faxing system (e.g., a faxing system remote from a sending system and/or a receiving system). The remotely deployed faxing system may be configured to create a queued fax for each fax received. Creation of such a queued fax may entail creating a job item and placing the job item in a queue centrally maintained by the deployed faxing system. Each job item in the queue may include a job identifier, a document identifier identifying a document associated with the fax received, and a customer or connector identifier identifying a receiving connector. The document is stored in a data store, separate from the queue.

The remotely deployed faxing system may be configured to receive a request from a receiving connector. The request may contain a connector identifier that identifies the receiving connector to the remotely deployed faxing system. In response to the request, the remotely deployed faxing system may access a queue and identify any job item(s) associated with the receiving connector. The job item(s) may then be used to retrieve queued fax(es). In some embodiments, the remotely deployed faxing system may proceed to send one or more of the queued fax(es) to the receiving connector. In some embodiments, the remotely deployed faxing system may first send a list of the queued fax(es) to the receiving connector and the receiving connector may send a request for one or more faxes on the list. For each requested fax, the remotely deployed faxing system may retrieve an associated document from the data store and send the document as a fax to the receiving connector. The receiving connector is required to acknowledge the receipt of the fax by generating and sending a release notification to the remotely deployed faxing system. In response to receiving the release notification from the receiving connector, the remotely deployed faxing system updates the queue and may delete or otherwise process and remove the document from the remotely deployed faxing system.

In this manner, faxes may remain at the remotely deployed faxing system for a minimal amount of time and deleted substantially as soon as confirmation of the delivery of the fax can be determined. In addition, according to certain embodiments, an expiration time may be assigned to the queued fax and the queued fax may be deleted when the expiration time has elapsed. As discussed above, deletion of a queued fax may entail deleting an associated job item from the queue and an associated document from the data store. Accordingly, even in the event that a request for the fax is not received, or a release notification associated with the fax is not received, the queued fax can be deleted after an appropriate time period.

Turning now to FIG. 1, one embodiment of an architecture including a remotely deployed faxing system is depicted. Architecture 100 includes fax connector (referred to hereinafter as "connector") 106 and content delivery system (referred to hereinafter as "faxing system") 130 communicating over network 110 which may be, for example, the Internet, an intranet, local area network (LAN), wide area network (WAN), or any IP-based network, PSTN, cellular network, fax network, wired network, wireless network, etc. Faxing system 130 may run on one or more computing devices such as server machines and may have access to data store 136. Additionally, faxing system 130 may be communicatively connected to traditional facsimile machines, virtual fax machines, and/or other faxing systems (referred to herein as "fax sources") that may or may not have fax connectors. For fax sources that do not have fax connectors, they may send faxes to faxing system 130; however, they may not retrieve faxes from faxing system 130.

Connector 106 may be installed at a site where one or more users wish to send or receive faxes. As an example, users 102*a* . . . 102*n* in architecture 100 may refer to companies, individual users, or any other entity wishing to send or receive faxes. Accordingly, connector 106 may include one or more computing devices or one or more computer processes executing on one or more computer devices utilized by such users 102*a* . . . 102*n* to send and/or receive faxes. Connector 106 may include an interface such as an application programming interface (API), services or hardware interface through which a fax may be sent from and/or received by client device(s) 104*a*, 104*b*, . . . , 104*n* of connector 106. Client device(s) 104*a*, 104*b*, 104*n* of connector 106 may include a fax machine, a printer, an enterprise resource planning (ERP) system, or another type of computing device, etc. Connector 106 may communicate with faxing system 130 over network 110 to send and/or receive a fax or faxes and provide them to a user or users (including a group or groups of users) through, for example, client device(s) 104*a*, 104*b*, . . . , 104*n*.

Faxing system 130 may include queue monitor 132 and connector interface module 134. Connector interface module 134 may be configured to receive a fax; create a queued fax containing a job item which references document(s) associated with the fax, place the job item in a queue 138, and store the document(s) in data store 136. At this point, the fax is considered to be in-queue at faxing system 130 for retrieval by a connector communicatively connected to faxing system 130 (e.g., connector 106). Queue monitor 132 may be configured to monitor and manage queue 138, as explained below.

Figure 2:
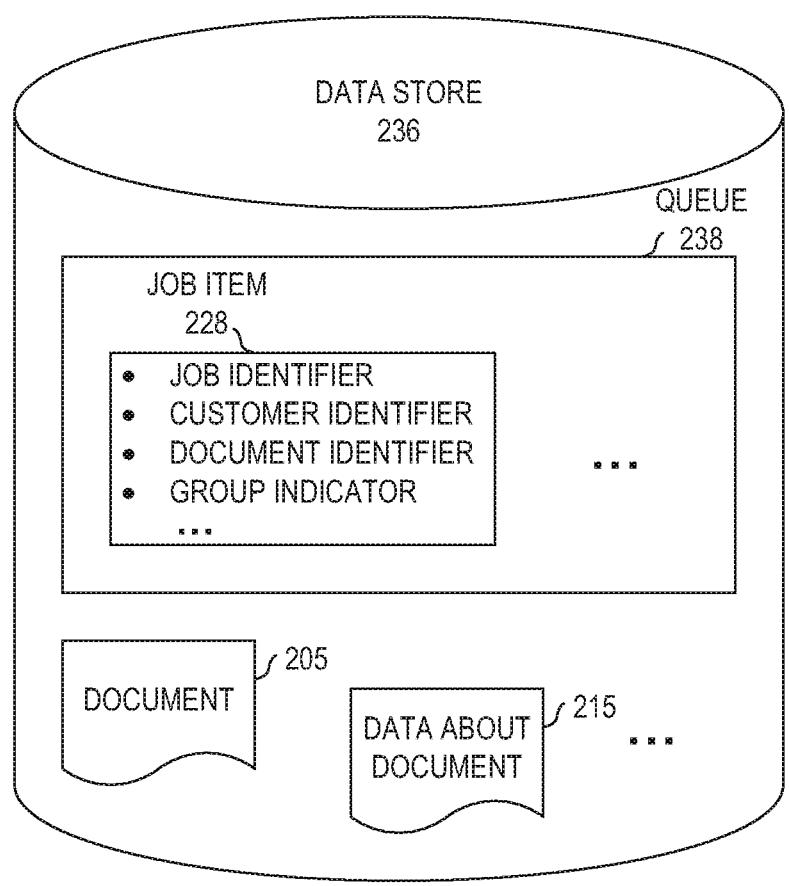
FIG. 2 depicts a diagrammatic representation of one embodiment of an example of a data store implementing a queue maintained by a faxing system.

FIG. 2 depicts a diagrammatic representation of one embodiment of an example of data store 236 implementing queue 238 maintained by a faxing system communicatively connected to multiple connectors (e.g., faxing system 130 and connectors 106 shown in FIG. 1). In some embodiments, the faxing system may be configured to manage delivery and maintenance of faxes of a plurality of destinations using a centrally managed, single queue 238. The plurality of destinations may be associated with one or more entities. In some embodiments, the faxing system may be configured to manage delivery and maintenance of faxes of a plurality of destinations using multiple queues.

In some embodiments, job item 228 may be placed in queue 238 by a connector interface module such as connector interface module 134 shown in FIG. 1. As illustrated in FIG. 2, in some embodiments, job item 228 may contain various identifiers including a job identifier identifying job item 228, a customer identifier (or connector identifier) identifying a customer (or connector) destined to receive the fax associated with job item 228, a document identifier identifying a document associated with the fax (e.g., document 205), a group indicator (where applicable) indicating a fax retrieval group, a pointer pointing to data about the fax and/or the document associated with the fax (e.g., data 215, etc.

In some embodiments, job item 228 may be created by a faxing system when a fax is received from a connector communicatively connected thereto. FIG. 3 depicts a flow chart illustrating one embodiment of method 300 performed by a faxing system such as faxing system 130 shown in FIG. 1 for receipt and maintenance faxes.

Specifically, at step 301, a faxing system may receive a fax from a sender (e.g., connector 106 shown in FIG. 1 or some other fax source). In some embodiments, a connector interface module of the faxing system such as connector interface module 134 of faxing system 130 shown in FIG. 1 may perform identify checking and verification of connectors at the sending side as well as at the receiving side. At step 305, the connector interface module may store the fax, for instance, in a data store such as data store 136 accessible by faxing system 130 as shown in FIG. 1. At step 310, the connector interface module may create a queued fax containing a job item such as job item 228 shown in FIG. 2. As explained above, such a job item may contain a job identifier which is an internal representation (internal to the faxing system) for identifying and tracking a fax that is being processed through the faxing system. Additionally, the job item may reference a document (or documents) as well as any relevant data associated with the incoming fax and may indicate a manner of retrieval (e.g., per a group indicator) and by what connector(s) (e.g., per a connector identifier).

FIG. 4 depicts a flow chart illustrating one embodiment of method 400 performed by a faxing system for delivery and maintenance of faxes. Specifically, when a connector wants to retrieve a fax, it may identify itself to a faxing system such as faxing system 130 shown in FIG. 1 by sending a request containing identification information previously registered with or otherwise communicated to the faxing system. Example of such identification information that identifies a connector may include a customer identifier, a connector identifier, etc.

At step 401, a connector interface module of the faxing system such as connector interface module 134 of faxing system 130 shown in FIG. 1 may receive such a request, verify the identity of the requesting connector, access a queue (e.g., queue 138 shown in FIG. 1 or queue 238 shown in FIG. 2), and determine if there are any queued faxes that are associated with the connector identifier. As an example, this determination may be made by comparing a connector identifier contained in the request with connector identifiers contained in job items in the queue.

Suppose one or more job items in the queue contain a connector identifier that matches the connector identifier contained in the request, the connector interface module may retrieve from a data store (e.g., data store 136 shown in FIG. 1 or data store 236 shown in FIG. 2) document(s) referenced in the job item(s) and send one or more corresponding queued faxes containing the document(s) to the connector (step 405). In some embodiments, a fax sent to the connector may also contain a job identifier and/or other related information (e.g., "Data About Document" 205 shown in FIG. 2).

According to embodiments, a connector is configured to send a release notification to a faxing system after a fax is received from the faxing system. At step 410, the faxing system receives the release notification from the connector via the connector interface module. This confirms the delivery of the fax. At step 415, the faxing system deletes the queued fax from its system and updates the queue accordingly.

Those skilled in the art can appreciate that there can be multiple variations to the example described above. For example, the connector interface module may represent one or more interfaces through which a request to send a fax may be received from a connector, along with the fax document and destination (e.g., a phone number) associated with that fax, or through which a request to retrieve or pull a fax or faxes as well as a release notification may be received. As another example, there can be various types of requests, including a send request, identify request, retrieve request, etc. Some embodiments of a faxing system may first send a requesting connector a list of faxes queued up at the faxing system that are meant for the connector. The connector may determine to retrieve all or a portion of the faxes based on some predetermined rules and/or criteria such as size, priority, time of day, network performance, security, etc. and send a retrieve request accordingly. A specific example is provided below with reference to FIG. 1.

Returning to FIG. 1, when user 102a wishes to send a fax, he may utilize client 104a (or client 104b, . . . , 104n) at the user's site to send the fax. Client 104a may provide the fax to fax connector 106 through an interface provided by fax connector 106. Fax connector 106 may then send a request to connector interface module 134 to send the fax. Connector interface module 134 may store a copy of fax document(s) 105 and any associated data received from fax connector 106 in data store 136. In one embodiment, connector interface 134 may create a queued fax comprising the fax document and a job item and place the job item in queue 138. The job item may contain associated data including, for example, a job identifier (job id) associated with the queued fax, an identifier associated with a destination (or sender) (e.g., a telephone number, identifier associated with connector 106 or other identifier), a document identifier that may be used to identify the fax document associated with the queued fax, etc. The connector interface module 134 may also assign an expiration time to the queued fax. It will be noted here that faxing system 130 may, in some embodiments, receive a fax in another manner, such as over the PSTN, using T38 time-division multiplex (TDM), etc., or through another interface or method. In any event, whenever such a fax is received by faxing system 130, a queued fax may be created for the received fax by faxing system 130.

In some embodiments, the same or different fax connector 106 may send an identify request that identifies itself (e.g., an identifier associated with connector 106) to connector interface module 134 to identify any queued faxes associated with that connector 106. Connector interface module 134 may receive the identify request from connector 106 and determine if there are job items in queue 138 associated with connector 106 using the identifier provided by connector 106 in the identify request and the data associated with the job items in queue 138. If there is a queued fax associated with connector 106, the queued fax is identified (e.g., using the job id) to connector 106 by connector interface module 134 in a response to the identify request. Otherwise, a response indicating no faxes were available may be sent to connector 106 by connector interface module 134.

If a queued fax was identified to connector 106, a retrieve request may be subsequently received by connector interface module 134 from connector 106, where the retrieve request may provide the job id of a previously identified queued fax.

In response to the retrieve request, connector interface module 134 may provide a queued fax to connector 106. Providing the queued fax may include determining a fax document associated with the provided job id and providing the fax document to connector 106 in a response to the retrieve request from connector 106.

Once the fax document has been provided to connector 106, connector 106 may send a release notification to connector interface module 134. The release notification may provide the job id associated with the fax document previously received by connector 106. When connector interface module 134 receives the release notification from connector 106, connector interface module 134 may determine a job item in queue 138 associated with the job id and update the status of the job item in queue 138 to indicate successful completion (e.g., change the status to "sent" or "complete").

Queue monitor 132 may determine that the status of the job item in queue 138 has changed to a status that indicates successful completion and based on the status change to a completed state, queue monitor 132 may delete the queued fax. This deletion may comprise deleting the job item from queue 138 (which is managed by queue monitor 132) and deleting the fax document associated with that job item from data store 136. Alternatively, only the fax document may be deleted and the job item in queue 138 may be maintained (or altered, or moved to another location, etc.) to indicate successful completion of that job item.

In certain embodiments, queue monitor 132 may also be configured to determine that an expiration time associated with a queued fax has elapsed without successful completion of that job item. When such a determination is made, queue monitor 132 may delete the queued fax, in some embodiments, irrespective of whether that fax has been delivered. Alternatively, only the fax document may be deleted and the associated job item in queue 138 may be updated to indicate expiration of that job item without successful delivery (or otherwise altered, or moved to another location, etc. to indicate this expiration.

In this manner, the time that faxes remain at remotely deployed faxing system 130 may be reduced and such faxes may be deleted substantially as soon as confirmation of the delivery of the fax can be determined.

While it should be understood from a review of the above description that embodiments disclosed herein may be implemented using a wide variety of architectures and hardware or software systems; that a faxing system may or may not be distributed; that all of the modules presented may be one or multiple modules with one or more interfaces; and that these one or more modules may be implemented and accessed in a variety of manners, it will be useful here to describe a particular embodiment in more detail.

Specifically, in one embodiment, the modules of a faxing system may be deployed using a cloud-based computing platform. By deploying the modules of the faxing system in the cloud, such modules can utilize the storage and functionality provided by the cloud-based computing platform while achieving increased accessibility and reliability and simultaneously alleviating the entity providing embodiments of such faxing systems and methods from the need to maintain the hardware or connectivity necessary for the provisioning of such services.

Figure 5:
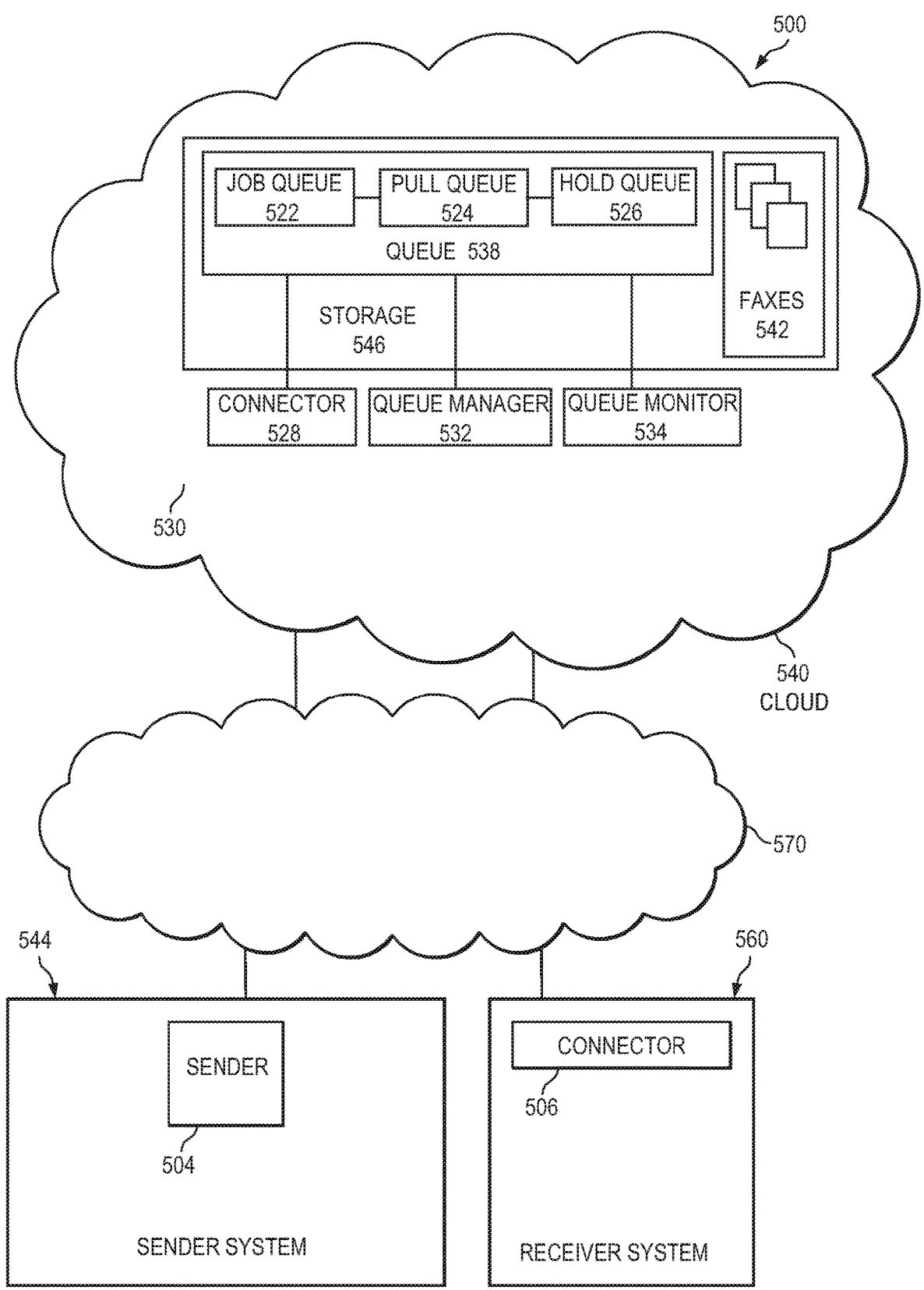
FIG. 5 depicts a diagrammatic representation of one embodiment of an example of cloud-based architecture for a faxing system.

With that in mind, turning now to FIG. 5, which depicts one embodiment of a faxing system architecture where certain modules are deployed in a cloud-based computing environment. Architecture 500 may include network 570 over which fax connector 506 of receiver system 560 and remotely deployed faxing system 530 may communicate. Remotely deployed faxing system 530 may be deployed in cloud-based computing environment 540. Cloud 540 may implement a multi-tenant architecture with various features including identification and authentication. Cloud 540 may provide a common delivery model such as Software as a Service (SaaS) that allows for sharing of a central queue by multiple users (tenants). Multi-tenant architecture is known to those skilled in the art and thus is not further described herein.

As illustrated in FIG. 5, in some embodiments, faxing system 530 may include fax connector interface module 528, queue manager 532 and queue monitor 534. Fax connector interface module 528 may have one or one or more interfaces that may be accessed by connector 506 of receiver system 560 over network 570 using hypertext transfer protocol (http) calls or other types of network protocols or interfaces. Thus, fax connector interface module 528 may represent one or more interfaces through which a request such as an identify request or retrieve request, or a release notification may be received.

Faxing system 530 may also include storage 546 comprising queue 538 and fax documents 542. Fax documents 542 may comprise the documents associated with faxes received by faxing system 530. Queue 538 may include job queue 522, pull queue 524, and hold queue 526. These may be referred to as sub queues. Each of these sub queues may include items, where each item may be associated with data, including for example, a job identifier (job id), an identifier associated with a destination (or sender) (e.g., a telephone number, identifier associated with connector 506 or other identifier) of a fax, a document identifier that may be used to identify a fax document 542, an expiration time, etc. Various software running on faxing system 530 may register with queue 538. By splitting queue 538 into sub queues (e.g., job queue 522, pull queue 524, and hold queue 526), one software can pull (from the pull queue) and the other can delete (from the hold queue), while users of the faxing system may manually cancel a job (from the job queue). This is further explained below.

In one embodiment, job queue 522 may be used by faxing system 530 to maintain items associated with a fax received by the system, including, for example, tracking or status data associated with a queued fax. Pull queue 524 may be utilized in conjunction with interactions with connectors at receiving faxing systems. Hold queue 526 may be used to track times associated with a received fax such that a received fax is not maintained indefinitely.

Queue manager 532 may be configured to manage queue 538, including placing items in queue 538 (e.g., job queue 522, pull queue 524, or hold queue 526), manipulating items in queue 538, providing notification of events that occur with respect to the items in queue 538, etc. Queue monitor 534 may be configured to monitor queue 538 (e.g., receive notification of certain events that occur with respect to each of job queue 522, pull queue 524, or hold queue 526) and take actions based on these notifications, as will be described in more detail below.

A fax may be received by faxing system 530 in a variety of manners, such as over the PSTN, using T38 time-division multiplex (TDM), etc., from sender 504 (e.g., a connector or another interface) at sender system 544. When faxing system 530 receives a fax, the fax document may be stored in fax documents 542 along with an associated document identifier. Additionally, a job item may be created with and placed in job queue 522. The created job item may be associated with a job id and the document identifier associated with fax document 542. The item may also have an associated status indicating the job item is pending.

When the job item for the received fax is placed in job queue 522, queue manager 532 may notify queue monitor 534 that a new item has been placed in job queue 522. Queue monitor 534 may access this job item and determine an expiration time associated with the job item, which may be a default value or otherwise determined. Once the expiration time is determined, queue monitor 534 may create a pull item and a hold item corresponding to the job item by creating copies of the job item and associating the expiration time with the hold item. The pull item is then placed in pull queue 524 and the hold item is placed in hold queue 526, such that if expiration time associated with the hold item in hold queue 526 elapses, queue manager 532 will notify queue monitor 534. Thus, in this particular embodiment, a queued fax may comprise a job item, a pull item, and a hold item associated with, for example, a particular job id, along with the fax document associated with the job item, pull item, or hold item using the document identifier.

Fax connector interface module 528 may be configured to receive an identify request from fax connector 506 at receiver system 560. Such an identify request may include a connector identifier associated with fax connector 506. In response to the identify request, fax connector interface module 528 may access pull queue 524 to determine if there are any pull items on pull queue 524 associated with the requesting fax connector 506 (e.g., using the destination identifier associated with the pull item and the connector identifier received in the identify request, etc.). If there is a pull item in pull queue 524 that is associated with fax connector 506, the queued fax is identified (e.g., using the job id) to fax connector 506 by fax connector interface module 528 in response to the identify request. Otherwise, a response indicating no faxes were available may be sent by fax connector interface module 528 to fax connector 506.

Fax connector interface module 528 may also be configured to receive a retrieve request from fax connector 506 at receiver system 560. If a queued fax was identified to fax connector 506, the retrieve request may be subsequently received by fax connector interface module 528 from connector 506, where the retrieve request may provide the job id of a previously identified queued fax. Using the job id provided in the retrieve request, a pull item corresponding to the retrieve request is located in pull queue 524 and the status of that pull item can be updated to a hold state (e.g., using queue manager 532). In one embodiment, there may be a hold state expiration time associated with the hold state, such that if the status has not changed from the hold state before expiration time has elapsed, queue manager 532 will notify queue monitor 534. A fax document corresponding to the queued fax can be located using the document identifier associated with the pull item and document provided to requesting fax connector 506 in response to the retrieve request.

Fax connector interface module 528 may also be configured to receive a release notification from fax connector 506. The release notification may provide the job id associated with the fax document previously received by the connector 506. When fax connector interface module 528 receives the release notification, fax connector interface module 528 may use the job id provided in the release notification to locate the pull item corresponding to the release notification in pull queue 524 and update the status of that pull item to a complete state (e.g., using queue manager 532).

When the pull item is updated to the complete state, queue manager 532 may notify queue monitor 534 that the pull item has been updated to the complete state. In response to this notification, queue monitor 534 may determine an appropriate job item in job queue 522, the hold item in hold queue 526, and the fax document corresponding to that pull item (e.g., using the job id or document identifier associated with the pull item). Queue monitor 534 can then update that job item with the status of the pull item (e.g., using queue manager 532) for reporting purposes. Additionally, queue monitor 534 may delete the pull item and the corresponding hold item and fax document (e.g., using queue manager 532). Thus, the fax document corresponding to the pull item may be deleted following confirmation that the fax document has been received by requesting fax connector 506.

If a release notification is not received from fax connector 506 before the hold state expiration time associated with the hold status of the pull item elapses, queue monitor 534 may be notified that this hold state expiration time has elapsed. In such cases, queue monitor 534 may return the status of the pull item to pending such that it may again be identified to fax connector 506 and processed accordingly.

Additionally, if the expiration time associated with the hold item in hold queue 526 expires (e.g., before the hold item is deleted), queue manager 532 may notify queue monitor 534 that the expiration time for that hold item has elapsed. In response to this notification, queue monitor 534 may determine an appropriate job item in job queue 522, the pull item in pull queue 524, and the fax document corresponding to that hold item (e.g., using the job id or document identifier associated with the hold item). Queue monitor 534 can then update that job item with a status indicating that the job had expired (e.g., expired prior to a retrieve request, expired after a retrieve request but prior to a release notification, etc.) for reporting purposes.

Additionally, queue monitor 534 may delete the hold item, the corresponding pull item and the fax document (e.g., using queue manager 532). Thus, the fax document corresponding to the hold item may be deleted after the expiration of a time period, irrespective of whether it has been retrieved.

In certain instances, faxing system 530 may receive a request to cancel a fax from the sender of the fax (or another entity with the rights to cancel a fax). When faxing system 530 receives such a request to cancel a fax, faxing system 530 may update the status of the corresponding job item in the job queue 522 to a cancel status. Queue manager 532 may notify queue monitor 534 that the job item's status has been updated to a cancel status.

In response to this notification, queue monitor 534 may determine an appropriate pull item in pull queue 522, the hold item in hold queue 526 (if any), and the fax document corresponding to that job item (e.g., using the job id or document identifier associated with the job item). Queue monitor 534 can then update that job item based on the status of the pull item (e.g., using queue manager 532) for reporting purposes. This status may indicate that the job was cancelled (e.g., cancelled prior to a retrieve request, cancelled after a retrieve request but prior to a release notification, etc.). Additionally, queue monitor 534 may delete the pull item and the corresponding hold item and the fax document corresponding to the job item (e.g., using queue manager 532). In certain cases, after queue monitor 534 is notified that a job item's status has been updated to cancel, queue monitor 534 may not be able to access or delete an item in queue 538 (e.g., a pull item, a hold item, etc.) as the item may have been locked by another module (e.g., fax connector 528 or queue manager 532) processing that item.

In these instances, queue monitor 534 may wait a certain period of time and repeat the attempt to access or delete the item.

Moving now to FIG. 6, one embodiment of method 600 for the delivery and maintenance of faxes is depicted. Initially, a fax may be received, where the fax includes a fax document and a destination identifier. As discussed above, the fax may be received, for example, over the PSTN, using T38 time-division multiplex (TDM), over an IP-based network, or through another interface or method. A queued fax associated with the received fax may be created. This queued fax may comprise the fax document received and a job item placed in a queue where the job item is associated with data for the queued fax, including, for example, a job identifier (job id) associated with the queued fax, an identifier associated with the destination (or sender) (e.g., telephone number, identifier associated with a destination, or other identifier), a document identifier that may be used to identify the fax document associated with the queued fax, etc. At this point, the queued fax is ready for delivery.

Accordingly, at step 601, a request may be received from a requestor (e.g., fax connector 506 shown in FIG. 5). The request may be an identify request or a retrieve request and may include an identifier associated with the requestor. A faxing system implementing an embodiment of method 600 can determine if there are any queued faxes associated with that identifier. This determination may be made, for example, by determining if there are any job items associated with the requestor using the identifier provided in the request and the data associated with the job items. If there is a queued fax associated with the requestor, the queued fax may be identified (e.g., using the job id). Otherwise, a response indicating no faxes were available may be sent to the requestor.

In some embodiments, the queued fax is identified but not sent in a response to an identify request. In such embodiments, a retrieve request may be subsequently received where the retrieve request may include an identifier (e.g., the job id) of a queued fax. In response to the retrieve request, a fax document associated with the provided identifier may be determined and provided to the requestor in response to the retrieve or pull request.

Accordingly, at step 605, the queued fax is sent to the requestor in a response to a retrieve or pull request. The queued fax is not deleted immediately after it is sent. Rather, at step 610, the queued fax is marked as under retrieval. In some embodiments, this may entail changing a status associated with the queued fax. For example, changing a status in a queue item (e.g., a job item or a pull item) associated with the queued fax to "pending." In one embodiment, if a queue item is in the pending state, a call to the manager of the queue to cancel the queue item effectively will remove the queue item from the queue.

As discussed above, in some embodiments, various software components of the faxing system may register with the central queue which includes a set of sub queues such as a job queue, a hold queue, and a pull queue. For example, when a retrieve or pull request is received, the job is pulled from a pull queue. When a job times out, that job is processed out of a hold queue. When a user decides to cancel a job, the job gets deleted from the job queue. Thus, for each job that comes in, three queue items are created, one for each sub queue. In some embodiments, the software component responsible for the job queue (e.g., connector interface module 528 shown in FIG. 5) may delete a job item from the job queue and be responsible to clean up the pull queue and the hold queue for corresponding pull item and hold item associated with the job item. Any of these software components can clean up its primary queue and the other two queues. This helps deletion to be done without error.

Because the retrieval-confirmation (release notification) is a two stage process, these software components may be configured to coordinate, at step 615, to prevent deletion or timeout of a queued fax that is marked under retrieval but has not yet been actually retrieved. As an example, suppose that in between the two stages where a customer comes in (via a connector) and wants to retrieve a fax and a pull item in the pull queue corresponding to the fax is marked "under retrieval," but the pull item has not actually been retrieved. At this in-between state, if a user such as an administrator of the faxing system comes in to cancel the job item corresponding to the pull item being retrieved or if the hold item corresponding to the pull item times out, the software components are configured to coordinate with each other (e.g., hold on performing their functions (deletion or processing) so that they do not remove an item that the customer is in the process of getting.

At step 620, a release notification may be received. The received release notification may provide the identifier (e.g., the job id) associated with the fax document previously received by the requestor. Subsequent to receiving the release notification from the requestor, at step 625, the queued fax associated with the identifier may be deleted from the faxing system. In one embodiment, the deletion may comprise determining the job item associated with the identifier and updating the status of the job item to indicate successful completion (e.g., change the status to "sent" or "complete") and the deletion of the fax document. In this manner, the time that faxes, or fax documents, remain at a remotely deployed faxing system may be reduced and such faxes may be deleted substantially as soon as confirmation of the delivery of the fax can be determined.

Figure 7:
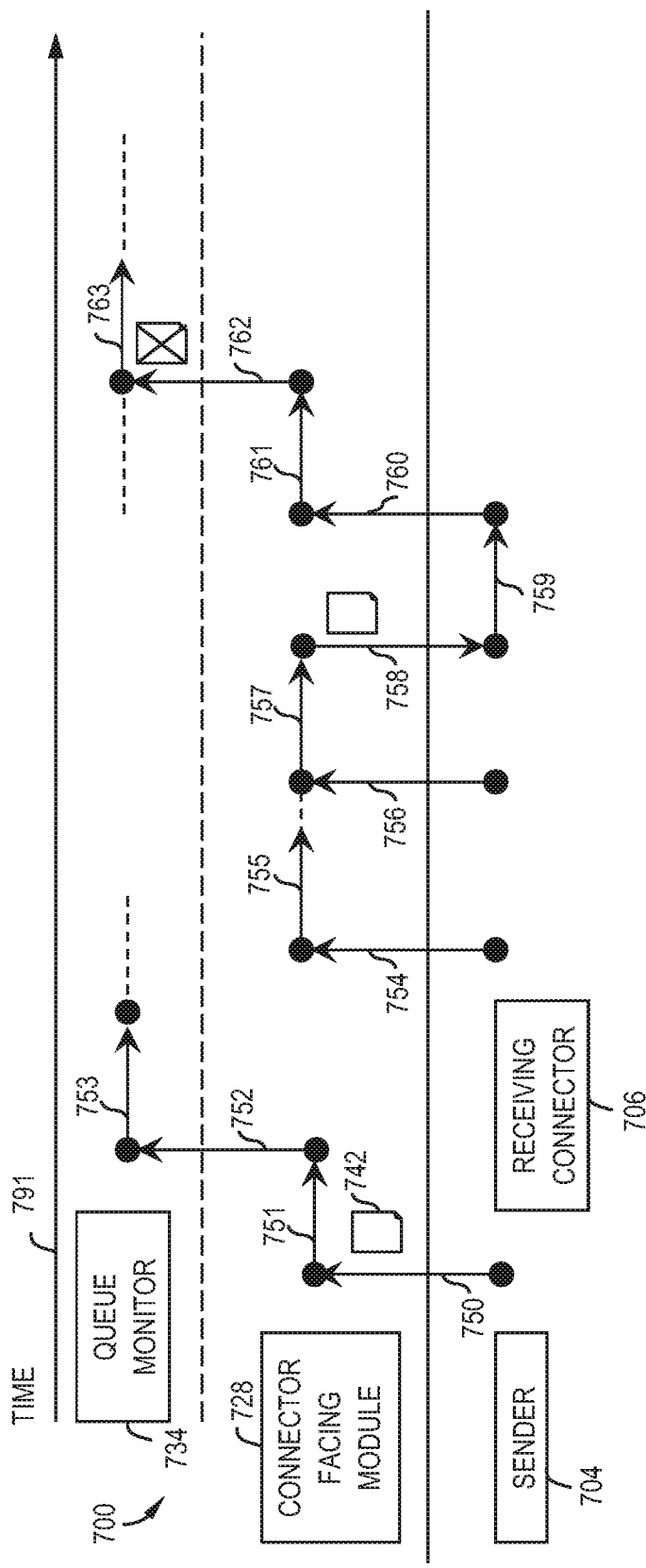
FIG. 7 is a flow diagram of one example of a faxing system for delivery and maintenance of faxes.

Turning now to FIG. 7, a flow diagram of one example of faxing system 700 for delivery and maintenance of faxes is depicted, including sender 704 (e.g., sender 504 shown in FIG. 5 and described in corresponding text), receiving connector 706 (e.g., connector 506 shown in FIG. 5 and described in corresponding text), connector facing module 728 (e.g., connector 528 shown in FIG. 5 and described in corresponding text), and queue monitor 734 (e.g., queue monitor 534 shown in FIG. 5 and described in corresponding text). Timeline 791 in FIG. 7 depicts a flow of time related to events and operations associated with the non-limiting embodiment of faxing system 700. At 750, faxing system 700 receives fax 742 (more specifically, connector facing module 728 receives fax 742) from sender 704. At 751, a job item associated with a queued fax is placed in a job queue, at 752, queue monitor 734 receives a job placement notification that the job item has been placed on the job queue and, at 753, queue monitor 734 places a pull item corresponding to the job item on a pull queue and a hold item corresponding to the job item on a hold queue.

At 754, connector facing module 728 receives a request from receiving connector 706 to identify the queued fax; the queued fax is associated with receiving connector 706. At 755, connector facing module 728 identifies the queued fax and, at 756, receives a request from receiving connector 706 to retrieve the queued fax. At 757, connector facing module 728 retrieves document 742 and, at 758, provides document 742 associated with the queued fax to receiving connector 706, which receives document 742 (denoted at 759).

At 760, connector facing module 728 receives a release notification from the receiving connector 706 and, at 761, connector facing module 728 updates the queued fax in the queue including updating a status associated with the pull item on the pull queue. At 762, queue monitor 734 receives a job status notification that the status associated with the pull item has been updated and, at 763, deletes the pull item from the pull queue, the hold item from the hold queue and the document 742 associated with the queued fax.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, a special-purpose computer, or a data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

ROMs, Random Access Memories (RAMs), and Hard Drives (HDs) are computer memories for storing computer-executable instructions executable by a central processing unit (CPU) or capable of being compiled or interpreted to be executable by the CPU. Suitable computer-executable instructions may reside on a computer-readable medium (e.g., a ROM, a RAM, and/or a HD), hardware circuitry or the like, or any combination thereof. Within this disclosure, the term "computer-readable medium" is not limited to ROMs, RAMs, and HDs and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include RAMs, ROMs, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such product, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for fax delivery, the method comprising:
   receiving, by a faxing system having a processor and a non-transitory computer-readable medium, a request from a receiving connector for a receiver system to retrieve a fax;
   determining, by the faxing system, a queued job item that is associated with the receiving connector, the queued job item having:
   a job identifier for identifying and tracking the fax through the faxing system, a document identifier identifying a document in a data store, and
a customer identifier that identifies the receiving connector or the receiver system;
sending, by the faxing system, the job identifier and the document associated with the fax to the receiving connector;
receiving, by the faxing system from the receiving connector, a release notification containing the job identifier; and
responsive to receipt of the release notification, deleting the queued job item using the job identifier and deleting the document from the data store using the document identifier, the deleting performed by the faxing system.

2. The method according to claim 1, wherein the faxing system is implemented on a server machine operating in a cloud computing environment.

3. The method according to claim 1, wherein the queued job item is created responsive to receipt of the fax from a sender system and placed in a queue maintained by the faxing system.

4. The method according to claim 1, further comprising:
marking the queued job item as under retrieval after sending the job identifier and the document associated with the fax to the receiving connector.

5. The method according to claim 1, further comprising:
assigning an expiration time to the queued job item;
determining whether the expiration time has elapsed; and
responsive to the expiration time having been elapsed, deleting the queued job item and the document from faxing system.

6. The method according to claim 1, further comprising:
receiving, by the faxing system, a query from the receiving connector as to whether the faxing system has any faxes for the receiving connector;
responsive to the query from the receiving connector, identifying any and all queued job items associated with the receiving connector and sending job identifiers and documents associated therewith to the receiving connector;
receiving, by the faxing system from the receiving connector, a release notification containing the job identifiers; and
responsive to receipt of the release notification, deleting from the faxing system the queued job items and the documents associated with the job identifiers.

7. The method according to claim 1, wherein the faxing system and the receiver system reside in different geographic locations.

8. A system for fax delivery, comprising:
a processor;
a non-transitory computer-readable medium; and
stored instructions translatable by the processor for:
receiving a request from a receiving connector for a receiver system to retrieve a fax;
determining a queued job item that is associated with the receiving connector, the queued job item having:
a job identifier for identifying and tracking the fax through the system,
a document identifier identifying a document in a data store, and
a customer identifier that identifies the receiving connector or the receiver system;
sending the job identifier and the document associated with the fax to the receiving connector;
receiving, from the receiving connector, a release notification containing the job identifier; and
responsive to receipt of the release notification, deleting the queued job item using the job identifier and deleting the document from the data store using the document identifier.

9. The system of claim 8, wherein the queued job item is created responsive to receipt of the fax from a sender system and placed in a queue maintained by the system.

10. The system of claim 8, wherein the stored instructions are further translatable by the processor for:
marking the queued job item as under retrieval after sending the job identifier and the document associated with the fax to the receiving connector.

11. The system of claim 8, wherein the stored instructions are further translatable by the processor for:
assigning an expiration time to the queued job item;
determining whether the expiration time has elapsed; and
responsive to the expiration time having been elapsed, deleting the queued job item and the document from system.

12. The system of claim 8, wherein the stored instructions are further translatable by the processor for:
receiving a query from the receiving connector as to whether the system has any faxes for the receiving connector;
responsive to the query from the receiving connector, identifying any and all queued job items associated with the receiving connector and sending job identifiers and documents associated therewith to the receiving connector;
receiving, from the receiving connector, a release notification containing the job identifiers; and
responsive to receipt of the release notification, deleting from the system the queued job items and the documents associated with the job identifiers.

13. The system of claim 8, wherein the system and the receiver system reside in different geographic locations.

14. A computer program product for fax delivery, the computer program product comprising a non-transitory computer-readable medium storing instructions translatable by a processor of a faxing system for:
receiving a request from a receiving connector for a receiver system to retrieve a fax;
determining a queued job item that is associated with the receiving connector, the queued job item having:
a job identifier for identifying and tracking the fax through the system,
a document identifier identifying a document in a data store, and
a customer identifier that identifies the receiving connector or the receiver system;
sending the job identifier and the document associated with the fax to the receiving connector;
receiving, from the receiving connector, a release notification containing the job identifier; and
responsive to receipt of the release notification, deleting the queued job item using the job identifier and deleting the document from the data store using the document identifier.

15. The computer program product of claim 14, wherein the faxing system is implemented on a server machine operating in a cloud computing environment.

16. The computer program product of claim 14, wherein the queued job item is created responsive to receipt of the fax from a sender system and placed in a queue maintained by the faxing system.

17. The computer program product of claim 14, wherein the instructions are further translatable by the processor for:

marking the queued job item as under retrieval after sending the job identifier and the document associated with the fax to the receiving connector.

18. The computer program product of claim 14, wherein the instructions are further translatable by the processor for:
assigning an expiration time to the queued job item;
determining whether the expiration time has elapsed; and
responsive to the expiration time having been elapsed, deleting the queued job item and the document from faxing system.

19. The computer program product of claim 14, wherein the instructions are further translatable by the processor for:
receiving a query from the receiving connector as to whether the faxing system has any faxes for the receiving connector;
responsive to the query from the receiving connector, identifying any and all queued job items associated with the receiving connector and sending job identifiers and documents associated therewith to the receiving connector;
receiving, from the receiving connector, a release notification containing the job identifiers; and
responsive to receipt of the release notification, deleting from the faxing system the queued job items and the documents associated with the job identifiers.

20. The computer program product of claim 14, wherein the faxing system and the receiver system reside in different geographic locations.

* * * * *